MULTI-DIMENSION PARITY CHECK SYSTEM

Filed March 27, 1962 4 Sheets-Sheet 1

INVENTOR
ARTHUR H. BALLARD
BY Hurvitz & Rose
ATTORNEYS

INVENTOR
ARTHUR H. BALLARD

BY Hurwitz & Rose

ATTORNEYS

Aug. 10, 1965 A. H. BALLARD 3,200,374

MULTI-DIMENSION PARITY CHECK SYSTEM

Filed March 27, 1962 4 Sheets-Sheet 3

INVENTOR
ARTHUR H. BALLARD

BY Hurvitz & Rose

ATTORNEYS

Aug. 10, 1965 A. H. BALLARD 3,200,374

MULTI-DIMENSION PARITY CHECK SYSTEM

Filed March 27, 1962

4 Sheets-Sheet 4

INVENTOR
ARTHUR H. BALLARD

BY Hurvitz & Rose

ATTORNEYS

United States Patent Office 3,200,374
Patented Aug. 10, 1965

3,200,374
MULTI-DIMENSION PARITY CHECK SYSTEM

Arthur H. Ballard, Arlington, Va., assignor to Melpar, Inc., Falls Church, Va., a corporation of Delaware Filed Mar. 27, 1962, Ser. No. 182,829
15 Claims. (Cl. 340—146.1)

The present invention relates generally to coded data transmission systems and more particularly to a coded data transmission system wherein parity signals are generated for each character within a phrase, for each word within a phrase, and for the several words which make up a phrase.

In the past, communication between two remote stations by pulse code communication, usually required two way transmission to obviate the possibility of error. In one way digital pulse code communication and transmission systems, there is a great chance of error because of fading, particularly with radio transmission.

Prior coding methods and techniques utilized in one way transmission permit the detection of random binary errors provided that the average frequency of errors is low and the errors are not highly clustered. When errors are detected, existing systems either delete the erroneous groups from the message or generate the most probable message as determined by the redundant structure of the code. The prior methods of correction and coding are either not effective when there are many digit errors in a group or require excessive complex instrumentation which are not feasible nor economic compared with the prior two way system.

The present invention employs a parity check for each character in a word, for each word in a phrase and for the several words within a phrase. Because of the numerous checks employed and the diversity of times in which the parity checks are transmitted, the probability of errors, even when highly clustered, is greatly eliminated. This should be evident because fading, which normally causes highly clustered errors, generally occurs only for short periods of time and by providing parity checks at widely separate times many different types of parity checks may be made. The bit rate may be maintained at a high speed despite the wide disparity in the occurrence of the various parity signals because of the manner in which the parity bits are derived. The information rate is also maintained at a relatively high percentage of the bit rate considering the accuracy which is obtained.

In the present invention, the received phrase containing the character, word and phrase parity signals is corrected by sequentially correcting an erroneous bit within each character, an erroneous character within each word and an erroneous word within each phrase. The correction of each erroneous bit within a character is accomplished by reversing the most doubtful or smallest amplitude bit of a character if the parity of the character fails to check.

The number of incorrect characters within each word is counted as the bits of the characters are corrected. If only one character within a word is incorrect, that character is replaced with a character derived from the parity of the characters which make up the word. The corrected, regenerated character is then inserted in its correct location within the characters of the particular word. If two or more characters are incorrect, but all of the common numbers bits in a word are correct, it may be assumed that the complete word is accurate, that all of the characters within the word are correct and that the complete word may be accepted as correct. If however two or more characters within a word are incorrect and there is a discrepancy in the parity check of the common bits within the several characters of the word, the word is accepted but identified as only partially correct.

After the processing of a word is completed, the processing of the several words within the phrase is accomplished. This is accomplished by counting the number of words having two or more character errors. If only one word has two or more character errors, that word is regenerated in response to the parity check from the remaining six words and the regenerated word is substituted for the incorrect word at the appropriate time. If more than one word contains two or more character errors, the phrase is accepted and read out but an indication is provided that the phrase is only partially correct.

In this manner the errors in reading out into a teletypewriter are minmized and an indication of any words or phrases which may be in error is provided.

Accordingly, it is an object of the present invention to provide a new and improved one way transmission system for digital data wherein parity check is provided for the characters, words and phrases of the transmitted word.

It is a further object of the present invention to provide a new and improved one way digital transmission system wherein errors between the transmitter and receiver are minimized even though they be highly clustered as they will be on fading radio circuits.

It is a further object of the present invention to provide a new and improved one-way digital transmission system employing three different types of parity checks wherein information rate is maintained at a high level and the probability of error is extremely small.

It is another object of the present invention to provide a new and improved one-way digital transmission system employing three different types of parity checks; which system is highly effective when there are many digit errors in a group and does not require excessively complex instrumentation.

Another object of the present invention is to provide a one-way digital communication system wherein a parity check is provided for each character, for each common numbered bit within the several characters of a word, and for each of the common numbered bits of the common numbered characters of the several words which comprise a phrase.

It is another object of the present invention to provide a one-way digital communication system wherein errors are corrected by insertion of the corrected bits of a charter, characters of a word, and words of a phrase.

A further object is to provide a one-way digital transmission system wherein a parity bit is inserted for each character, a parity character is inserted for each word, and a parity word is inserted for each phrase.

The above and still further objects, features and advantages of the present invention will become apparent upon consideration of the following detailed description of one specific embodiment thereof, especially when taken in conjunction with the accompanying drawings, wherein.

Figures 1, 3:
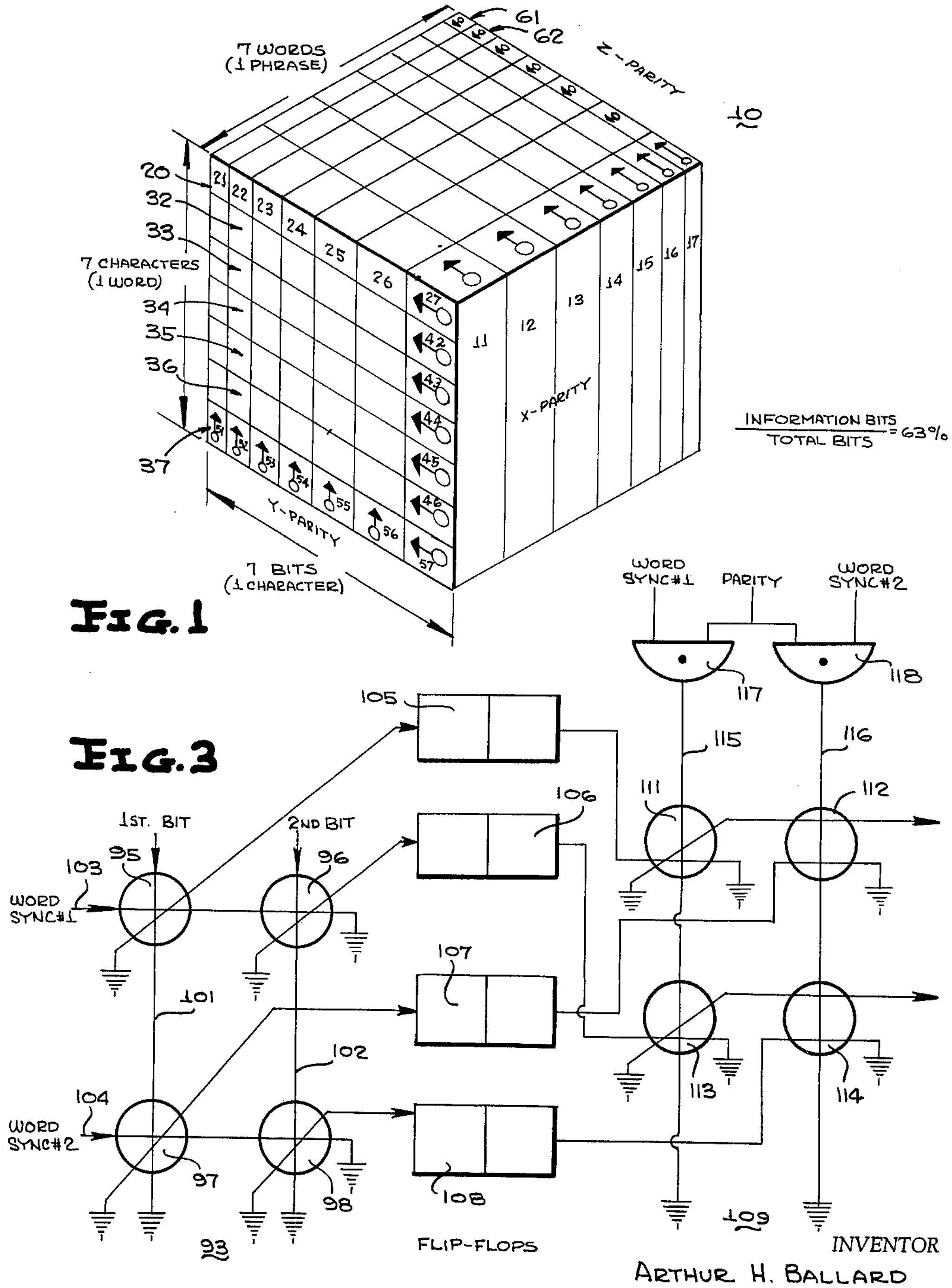
FIGURE 1 is a spatial representation of a three-dimensional parity check curve.
FIGURE 3 is a schematic diagram of the parity read-in, read-out and flip-flop circuitry for a small scale system.

FIGURE 1 is a spatial representation of the manner in which a three-dimensional parity check is generated in accordance with the present invention. The block 10 is a representation of a complete phrase including both intelligence and parity bits. The phrase is made up of seven words, each of which is made up of seven characters, each of which includes seven bits or bauds.

In transmitting a message, the bits of each character are sequentially transmitted so that the intelligence bits 21–26 are generated at times T1, T2 . . . T6, as denoted by the X axis of the block 10. After the intelligence bits 21–26 of the first character of the first word are generated, a parity bit 27 is generated. The polarity of the parity bit is dependent upon the relative polarities of bits 21–26. If there is an even number of marks in bits 21–26, the bit 27 is a space while the opposite conditions prevail when the number of marks in bits 21–26 is odd. Thus, parity bit 27 is of such polarity, mark or space, as to maintain the total number of mark bits in the first character even.

Upon completion of parity bit 27, a second character 32 consisting of six additional intelligence bits and parity bit 42 is generated. Parity bit 42 is generated in response to the same combination of mark and space signals in the intelligence bits of character 32 as was parity bit 27 in response to the intelligence bits 21–26. In a similar manner, parity bits 43, 44, 45 and 46 are generated in response to the bits included in characters 33–36, respectively.

Upon completion of the first intelligence word composed of characters 20, and 32–36, a parity character containing the Y parity bits 51–56 is generated. The Y parity bits 51–56, being derived in response to a parity check in the Y axis of the block 10, are generated by making a parity check on the first through sixth bits, respectively, of characters 20 and 32–36. Bits 51–65 are generated of such polarity as to maintain the number of marks within each column of the first word even. If it is assumed that the first bit of characters 20, and 32–36 are MMSSM, parity bit 51 will be a M; wherein M represents a mark and S a space. On the other hand if the second bit of each of the characters 20, 32–36 is of the form MSSSM, parity bit 52 will be a S in order to maintain the number of marks in the second column of the characters in the first word even. Upon completion of the word 37 made up of parity bits 51–56, parity bit 57 is generated to maintain the number of marks in row 37 an even number.

Upon completion of the first word, a second word is generated having similar intelligence and parity bits and characters. In total, six words 11–16 of this nature are generated.

Upon completion of word 16, a parity word 17 is generated in response to a parity check of the common rows of the different words in the Z axis of block 10. In response to the first bit of the first character of each of words 11–16, Z parity bit 61 is generated so as to maintain the number of marks in the first bit of the first character of each of the words even. In a similar manner the second bit of the first character of each of the words 11–16 is generated. A Z parity block is thus derived having 36 parity signals therein. There are no bottom or right-hand side rows in the Z parity block because these signals are derived in response to the signals generated in the Z parity block.

By employing a code having parity in all three dimensions, i.e. relative to characters, words and bits, most errors due to noise in one-way digital transmission channels are eliminated even when such errors are highly clustered as they will frequently be on fading radio circuits.

It is to be understood that the number of bits employed in a character, the number of characters in a word, and the number of words in a phrase may be varied as deemed appropriate by the code employed in transmitting and receiving. The information rate, i.e. the percent of time in which information bits are transmitted in comparison with the total number of bits transmitted may be calculated for the general situation as $$\frac{(P-1)(Q-1)(R-1)}{PQR}$$

wherein P, Q, and R are integers representing the number of bits in a character, the number of characters in a word, and the number of words in a phrase, respectively. Thus in a seven by seven by seven system as disclosed spatially in FIGURE 1, the information rate is 63%.

Figure 2:
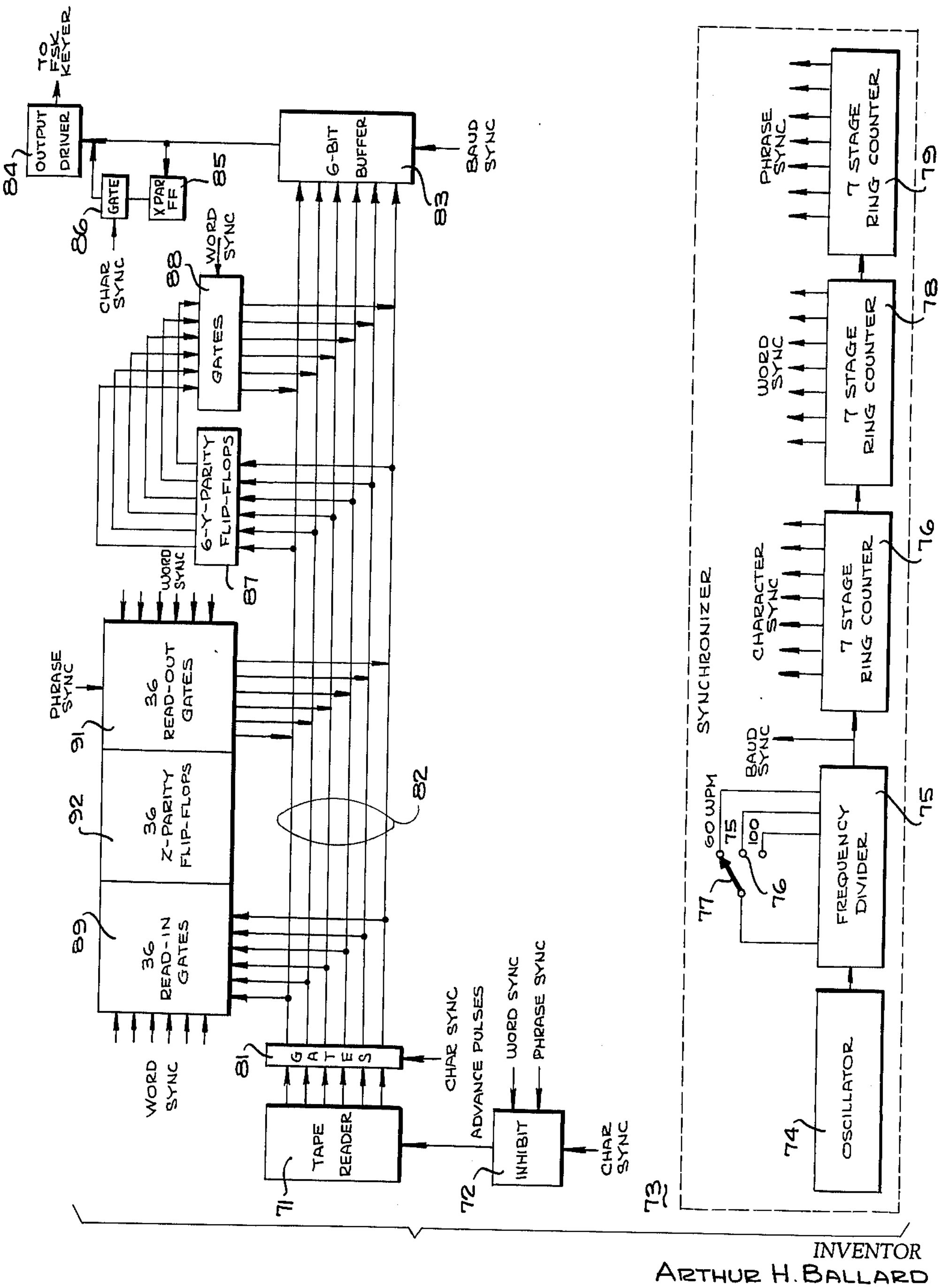
FIGURE 2 is a block diagram of the encoder unit broadcast system.

Reference is now made to FIGURE 2 of the drawings which discloses in block diagram form the transmitter parity encoder of the present invention which includes a tape reader 71, having six parallel output channels for simultaneously sampling the six bits of each character. The tape which is read by reader 71, includes six parallel tracks, one track for each bit. The lines of each track are representative of a particular character composed of the six bits. The read-out of reader 71 is controlled by character, word, and phrase sync pulses applied to inhibit gate 72.

To derive the character, word and phrase sync pulses, the synchronizer unit 73 is provided. Synchronizer 73 includes an audio frequency oscillator 74 coupled to a frequency divider of the standard ring counter type. Frequency divider 75 includes three variable taps 76 for controlling the rate which the equipment is designed to operate. By positioning the pointer 77 on one of the terminals 76, the length of the ring counter is varied to be 60, 75 or 100 words per minute. Of course it is to be understood that other desirable word rates may be employed as deemed necessary.

The output of frequency divider 75 is applied to a seven-stage ring counter 76 and to an independent output, designated as baud-sync. A baud-sync pulse is derived for each bit transmitted, whether it be an information or parity bit. The ring counter 76 derives seven different out of phase pulses, one pulse being derived from each stage of the counter. The pulses are of the same duration as the baud-sync pulse but occur at one-seventh the rate thereof. The pulses derived from the seven stages of ring counter 76 are termed character sync pulses because they control the application of intelligence and parity bits in each character.

The output of the seventh stage of ring counter 76 is applied as the input to the first stage of a further seven stage ring counter 78. The output pulse of each stage of ring counter 78 is seven times as great as the length of the pulse applied thereto from ring counter 76. The seven output pulses from ring counter 78 are derived in an out of phase manner and the counter has a total periodicity of 1/49 that of the baud-sync pulse. The pulses derived from the separate stages of counter 78 are of such a duration as to control the generation of the six intelligence characters and the parity character of each word and are accordingly designated word sync pulses.

The output signal from the last stage of counter 78 is applied as the input to a further frequency divider in the form of ring counter 79. The output taken from the seven stages of counter 79 are related to the input derived from the last stage of counter 78 in exactly the same manner as the outputs from the seven stages of counter 78 are related to the input applied thereto from the last stage of counter 76. Thus, the pulses derived from the first six stages of counter 79 are employed for controlling generation of the intelligence words within each phrase and the output of the last stage of counter 79 is utilized for deriving a sync pulse for control of the parity word in the phrase.

Once during each character, a character sync pulse is applied from one stage of counter 76, and fed through inhibit gate 72, to advance the tape in reader 71. The character sync pulse advances the tape in reader 71 except when word or phrase sync pulses are applied from a predetermined stage of counters 78 and 79. The word and phrase sync pulses applied to inhibit gate 72 are utilized for inhibiting advance of the tape in reader 71 so that word and phrase parity pulses may be inserted in the message being transmitted.

When the tape in reader 71 is positioned properly in front of each of the read-out heads, a pulse is derived from a further stage of the counter 76 to enable gates 81 to pass the six bits in a character to leads 82 for a time equal to one baud length. The parallel pulses fed through gates 81 from reader 71 are applied to buffer 83, which is in the form of a six stage shift register. The signals on leads 82 cause a zero or one to be stored in the respective stages of buffer 83 with which the leads are connected. The sync baud occurring after the signals on lead 82 are stored in buffer 83, causes read-out from the first stage of the buffer into output driver 84 and X parity flip-flop 85. The generation of successive bauds and application thereof to buffer 83 results in the serial generation of mark and space pulses from it. These serial pulses are indicative of the parallel outputs derived from reader 71 when gates 81 were enabled. When the six stages of buffer 83 are read-out, no signal is stored therein. Generation of the seventh sync baud in a character causes no output to be derived from buffer 83.

The successive output pulses of buffer 83 cause flip-flop 85 to shift states when the polarity of the bits change. X parity flip-flop 85 is maintained in a space state prior to the generation of the first bit of each character. Reset provision is provided within the flip-flop 85 to maintain this condition. If the total number of marks derived from buffer 83 during the first six bits of a character is even, flip-flop 85 is maintained in the space condition because it will have been switched from a space to a mark and back to a space condition in response thereto. The contrary is true when an odd number of pulses are derived from buffer 83 during a character. Thus, flip-flop 85 provides an indication of the parity bit which should be added to the first six bits of each character. Upon generation of the six sequential bits of a character from buffer 83, gate 86 is enabled by one of the stages of counter 76 to pass the signal stored in flip-flop 85 to output driver 84. Thus, the parity bit is inserted subsequent to generation of the six intelligence bits in each character. The output signal derived from driver 84 is applied to a standard frequency shift key keyer from whence it is transmitted by line or radio.

To control insertion of a parity character in each word, six parity flip-flops 87 and six gates 88 are provided. Each of the six parity flip-flops 87 is responsive to a separate signal derived on each of the leads 82. Flip-flops 87 are maintained at the beginning of each word by reset means in a space condition so that successive application thereto of mark and space pulses from tape reader 71 for each character results in sequential switching and changing states thereof. Thus, upon completion of a word, each of the flip-flops 87 has stored therein a signal commensurate with the parity pulse for the common bits of each character.

When the six intelligence characters of a word have been generated and there is no advance of tape reader 71, a pulse from one of the stages of ring counter 78 is applied to gates 88 so that the signals stored in flip-flops 87 may be applied in parallel to buffer 83. The signals stored in buffer 83 in response to the states of flip-flops 87 are read out from the buffer in exactly the same manner as intelligence bits are read out therefrom. In consequence, a parity bit is also generated for the parity character of each word.

To control generation of the parity word, gate matrices 89 and 91, as well as flip-flops 92 are provided. The read in matrix 89, having 36 separate gates, is responsive to the six signals derived on lead 82 and to the output signals from the first six stages of ring counter 78. The word sync pulses sequentially applied to the six different vertical input leads of matrix 89 cause the signals on leads 82 to be routed to 36 different flip-flops 92. Flip-flops 92 are reset to a space condition subsequent to each phrase being generated. The output signals derived from the 36 parity flip-flops 92 are routed sequentially to lead 82 by means of word sync pulses sequentially applied to each of the vertical leads supplying read out gates 91. Read out gates 91 are activated only when an output signal is derived from a single stage of counter 79 so that an output is obtained therefrom only during one word of each phrase. The outputs from gate 91 are applied in parallel to buffer 83 from whence they are read out in exactly the same manner as intelligence bits are read out for characters and words.

To describe and more readily explain the manner in which steering gate matrices 89 and 91 cooperate with flip-flops 92, the detailed circuit of FIGURE 3 is provided. The circuit of FIGURE 3 is exemplary for establishing a parity word in a system having two intelligence bits per character, two intelligence characters per word, and two intelligence words per phrase wherein a parity bit is added to each character, a parity character is added to each word and a parity word is added to each phrase. The techniques employed in FIGURE 3 may easily be extended to a system employing any number of bits in a character, characters in a word and words in a phrase.

The read-in matrix 93 of FIGURE 3 includes four switching devices which may be magnetic cores 95, 96, 97 and 98. The vertical leads 101 and 102 apply the first and second intelligence bits of each character derived from a tape reader to the switching elements of the matrix 93. Sync pulses derived from separate stages of ring counter 78 are applied on horizontal leads 103 and 104 to the switching elements and matrix 93. The pulses applied on leads 103 and 104 are of a duration equal to the length of a tape character so that switching elements 95 and 96 are simultaneously activated. Subsequently, switching elements 97 and 98 are simultaneously activated for an equal duration. When the first character of a word is being read out from tape reader 71, lead 103 is activated so that the parallel bits applied to switching elements 95 and 96 are transmitted to flip-flops 105 and 106, respectively. When the next character of the first word is being read out from the reader, lead 104 is activated, lead 103 being unactivated. This causes signals indicative of the first and second bits of the second character to be applied to flip-flops 107 and 108 by switching elements 97 and 98, respectively.

When the first character of the second word is being read into matrix 93, lead 103 is again energized and switching elements 95 and 96 pass signals to flip-flops 105 and 106 indicative of the first and second bits. If flip-flop 105 had previously stored a mark signal, indicative of the first bit of the first character of the first word being a mark, and the first bit of the first character of the second word is a mark, the flip-flop is then restored to its initial space output. In a similar manner, flip-flop 106 is responsive to the second bit of the first character of each of the words in a phrase and flip-flops 107 and 108 are responsive to the first and second bits of the second character of each word. In consequence, flip-flops 105–108 store at the end of the two intelligence words of a phrase, signals indicative of the parity word. Read-in to matrix 93 occurs only for the first and second characters of each word since the switching elements 95–98 thereof are not activated at the time the parity character of a word is being generated.

To generate the parity word of each phrase, matrix 109 is provided. Read-out matrix 109 includes four switching elements 111, 112, 113 and 114 of similar construction to the switching elements of matrix 93. Switching elements 111–114 are respectively responsive to the mark and space signals derived from the outputs of flip-flops 105–108. Vertical leads 115 and 116 apply word sync pulses to switching elements 111 and 113 as well as to switching elements 114 and 116, respectively. Read-out pulses are applied to leads 115 and 116 only when the parity word is being generated as controlled by the output of the phrase sync pulse from ring counter 79. The phrase sync pulses from one stage of ring counter 79 are applied in parallel to AND gates 117 and 118 which feed leads 115 and 116, respectively.

When the first character parity bits are read out, a pulse is applied from one stage of ring counter 78 to coincidence gate 117 to enable switching elements 111 and 113 to read out the signals stored in flip-flops 105 and 106. To determine the parity bit of the parity character of the parity word, a pulse is derived from flip-flop 85 subsequent to application of the outputs from switching elements 111 and 113 to the buffer 83 in exactly the same manner as a parity bit for an intelligence word is read out. Upon the completion of the first parity character of the parity word, a pulse is applied to AND gate 118 to enable switching elements 112 and 114 to read the parity outputs from flip-flops 107 and 108. These parity bits which make up the second parity character of the parity word are similarly applied to parallel to serial converter 83 for read out and insertion of a parity bit.

The signals transmitted from the keyer are in the form of positive and negative pulses indicative of the mark and space conditions, respectively, of the signal derived from the tape reader and of the parity signals. These signals are frequently distorted in amplitude due to fading conditions in the transmission link. In consequence, the signal received at the receiving station does not represent a true replica of what has been transmitted and a correction system must be provided to restore the receive signals to a value commensurate with those transmitted. Such correction is obtained by a parity pulse check.

Figure 4:
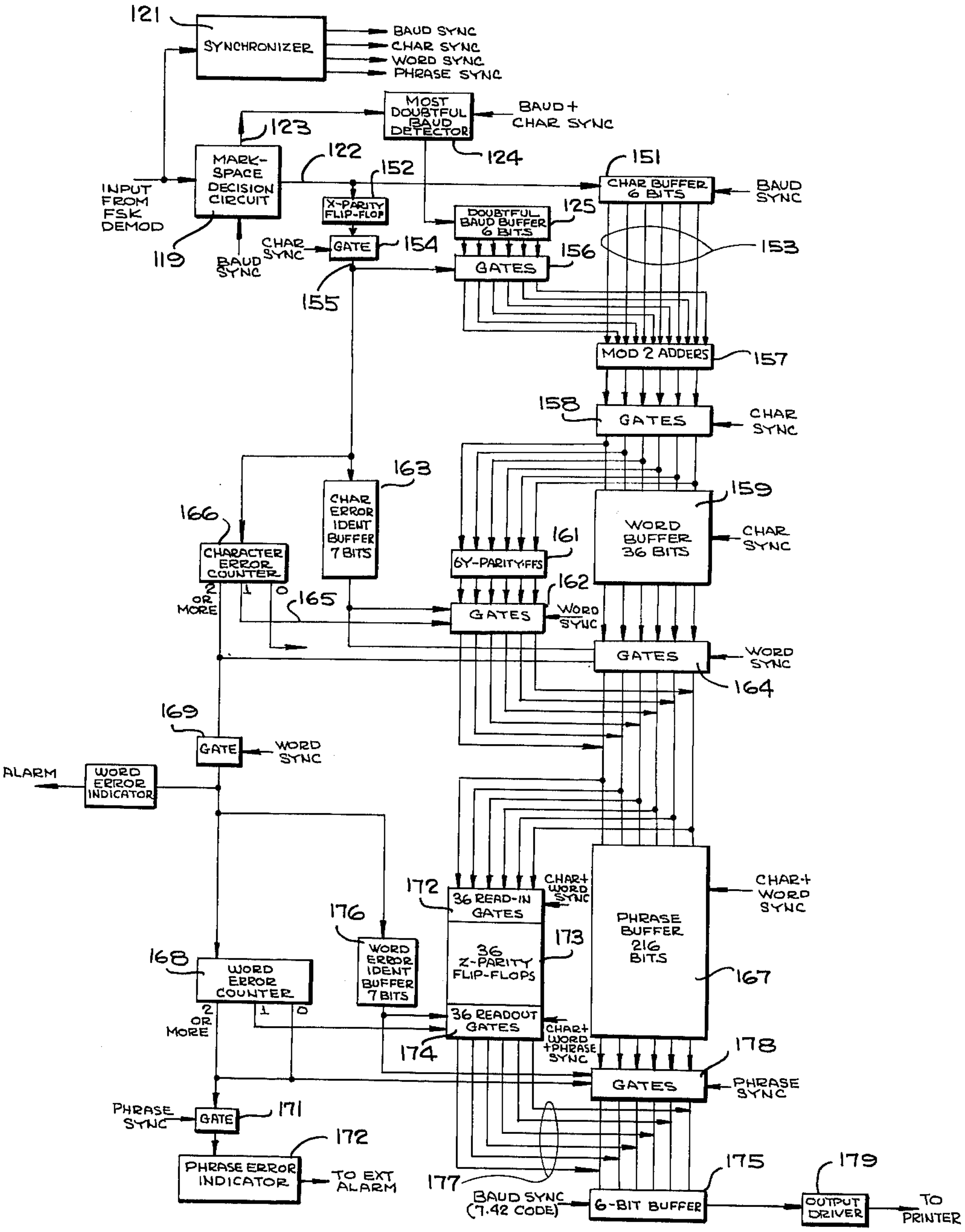
FIGURE 4 is a block diagram of the receive system.

The apparatus of FIGURE 4 is employed for restoring the received amplitude distorted signal to its corrected value. This is accomplished by correcting each character by the Wagner correction method wherein the number of marks in a character is counted. If the number of counted marks in a character is odd and the transmitter was generating in response to the parity pulse an even number of marks for each character, the most doubtful bit within a character is corrected as determined by the amplitude of the received distorted signal.

After each character is corrected, each word must be corrected. This is accomplished by correcting each character by the method previously discussed, i.e. to reverse the most doubtful bit thereof if the character parity fails to check. After each character is corrected, the number of characters in which there was parity failure is counted. If only one character was corrected, this character is discarded and re-generated to its correct form by parity addition thereof with the six remaining characters. If two or more characters were incorrect and the character parity in the word is accurate, all characters in a word are assumed correct. If, however, two or more charachters were incorrect in a word and one or more parity checks in a word were incorrect, the word is accepted but is identified as only partially correct.

After each word is corrected, the number of uncorrectable words, i.e. those words with two or more errors is counted. If only one word is uncorrectable, it is regenerated from the remaining six words to derive the correct word. If more than one word is uncorrectable the phrase is accepted with an indication that it is only partially correct.

These operations are carried out with the apparatus of FIGURE 4 by applying the received, distorted signal to a frequency shift key demodulator which generates positive and negative signals commensurate with the amplitude of the mark and space received signals. The output of the frequency shift key demodulator is applied in parallel to a mark-space decision circuit 119 and to a synchronizer circuit 121.

Synchronizer 121 derives baud, character, word, and phrase sync signals in response to the signals applied thereto so that the receiver remains in synchronism with the transmitter. The baud and character sync signals are of the same duration but the baud signals occur seven times more frequently than those of the character signal. Each word sync signal derived from synchronizer 121 is equal in time duration to seven baud sync signals but occurs at a rate of 1/7 that of the character sync signals. Similarly the phrase sync pulses are seven times as long as the word sync pulses but have a rate of 1/7 that of the word sync signal.

In response to the variable amplitude pulses applied thereto from the frequency shift key demodulator, mark-space decision circuit 119 derives on lead 122 mark and space signals of constant amplitude, either zero or one. A one signal is generated in response to any positive pulse applied to the mark-space decision circuit 119 while a zero pulse is generated on lead 122 whenever the input to circuit 119 is negative. Thus, the output of circuit 119 is a regeneration of the signals applied thereto.

Mark-space decision circuit 19 includes a further output lead 123 upon which are generated variable amplitude signals commensurate with the energy levels of the distorted signals applied to circuit 119. The signals on leads 123 are of positive and negative polarity depending upon the polarity of the pulses applied to circuit 119. These variable amplitude positive and negative pulses are applied to most doubtful baud detector circuit 124. Detector 124 generates an output in response to the first bit of each character which is stored in most doubtful baud buffer 125. The amplitude of the first bit is stored in detector 124 for comparison with the other six bits in each character. If the first bit is of equal or smaller amplitude than the other bits of the character, no further output is derived from detector 124. If, however, a bit of smaller amplitude than the first occurs within the character, a pulse is generated on the output lead of detector 124 and supplied to buffer 125. This pulse destroys the previous signal stored in buffer 125 and causes it to store a new signal. Buffer 125 is set in response to each baud sync signal so that the position of the pulse therein at the end of a character is indicative of the most doubtful baud i.e. that baud having lowest amplitude, in a character.

Figure 5:
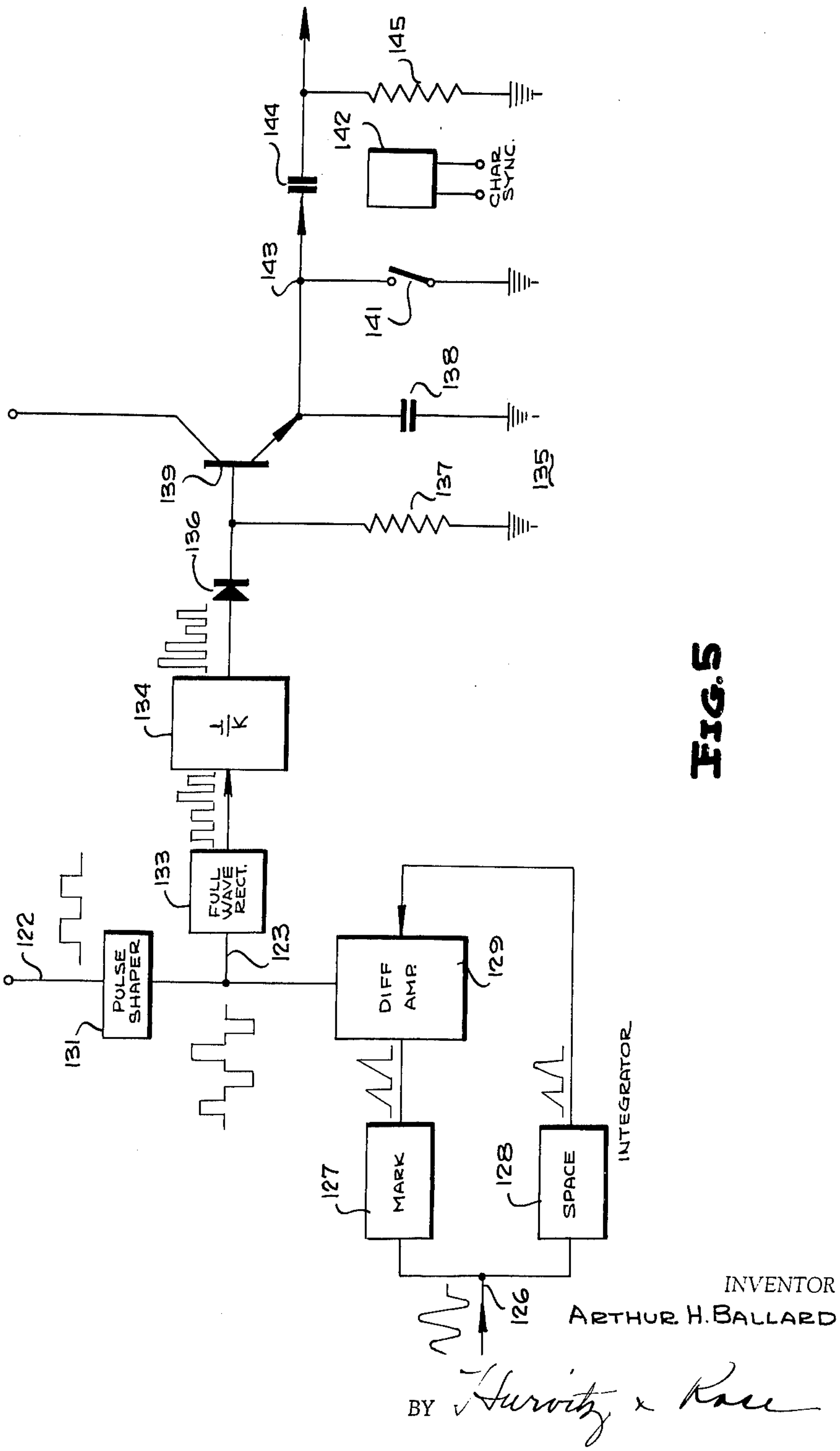
FIGURE 5 is a schematic diagram of a portion of the system of FIGURE 4.

The mark-space decision circuit 119, and most doubtful baud detector 124 are specifically illustrated in a preferred embodiment in FIGURE 5. The variable, distorted, amplitude signal containing the mark and space pulses is applied on lead 126 to mark and space integrators 127 and 128. Mark and space integrating circuits 127 and 128 are of the conventional reset type which are reset after the application of each bit thereto. Integrator 127 is adapted to generate output signals having peak amplitudes commensurate with the maximum value of each mark signal on lead 126 while space integrator 128 generates a positive signal indicative of the energy content of each space signal applied thereto.

The triangular wave outputs of integrators 127 and 128, are applied to the different inputs of differential amplifier 123. In response to the triangular wave inputs applied thereto, differential amplifier 129 generates output pulses of opposite polarity, positive pulses being generated in response to pulses from mark integrator 127 and negative pulses being generated in response to pulses from space integrator 128. The pulses derived from amplifier 129 are of variable amplitude but of constant width. The amplitude of the pulses is commensurate with the peak amplitude of the outputs of integrators 127 and 128. The positive output pulses from differential amplifier 129 are fed through pulse shaping rectifier 131 so that mark pulses are derived on lead 122 for each occurrence of a mark signal on lead 126.

The output of differential amplifier 129 is also applied to full wave rectifier 132 via lead 123. The output of the full wave rectifier 133 comprises a series of variable amplitude, constant width pulses of identical polarity. The amplitude of the pulses is commensurate with the amplitude of the output pulse from amplifier 129. The output signal of full wave rectifier 133 is applied to an amplitude inversion circuit 134 which derives output pulses inversely proportional to the amplitude of the pulses applied thereto.

The output pulses from inversion circuit 134 are applied to sampling and storage circuit 135. Sampling and storage circuit 135 includes diode 136, responsive to the output pulses of inversion circuit 134. A base bias resistor 137 is connected between the cathode of diode 136 and ground. The first pulse in each character is applied to the storage capacitor 138 connected in the emitter circuit of transistor 139 since the capacitor 138 stores zero charge thereon upon initiation of each character. Resetting of capacitor 138 to zero charge prior to each character is accomplished by means of relay armature 141 connected in parallel therewith. The relay armature 141 is activated by relay coil 142 in response to the generation of a character sync pulse.

The first bit of each character causes capacitor 138 to be charged to a value dependent upon the output voltage of inversion circuit 134 for that bit. When the next bit occurs, and it is of greater amplitude than the first bit, resulting in a lower amplitude pulse being derived from inversion circuit 134, there is no change in the charge stored on capacitor 138 because of the isolating effect of transistor 139 and diode 136. Transistor 139 is cut-off by the positive voltage at its emitter in response to the charge on capacitor 138, and remains in this condition until the voltage at the cathode of diode 136 exceeds the stored capacitor voltage.

If, however, one of the bits within a character is of less amplitude than the first or any succeeding bit, the output pulse derived from inversion circuit 134 will be of greater amplitude than the previous pulses derived therefrom and a new voltage is stored in capacitor 138. This occurs because the larger amplitude output from inversion circuit 134 will be passed through diode 136 and cause a change in the charge on capacitor 138 since transistor 139 will be rendered conductive.

Whenever a new pulse is stored in capacitor 138, a variation in the voltage on lead 141 suddenly occurs. This sudden change in voltage on lead 143 is applied to a differentiator including capacitor 144 and resistor 145. The sudden change in voltage on lead 143 results in a large amplitude pulse being generated across resistor 145. The amplitude of this pulse is sufficient to activate buffer 125. Accordingly, the pulse applied to buffer 125 determines which bit or baud in a character is most likely to be in error.

Reference is again made to FIGURE 4 of the drawings for a description of the manner in which the remainder of the correction circuit functions. The serial mark and space output pulses derived on lead 122 are applied to character buffer 151 and X parity flip-flop 152. Character buffer 151 is a six stage shift register wherein the sequential regenerated mark and space pulses on lead 122 are applied thereto and shifted from one stage of the shift register to the next in response to each baud sync signal.

Upon storage of the six intelligence bits of the character, the stages of shift register 151 are read out in parallel on leads 153 and the stages of the shift register are restored to their initial state. At the same time that the mark and space pulses are being fed into character buffer 151, they are applied to X parity flip-flop 152. If an even number of mark pulses occurs within a seven bit character, X parity flip-flop 152 is, at the end of the character, in its initial state so that upon generation of a character sync pulse and application thereof to gate 154, no output is obtained on the output lead 155. This indicates that no error ostensibly occurred in transmitting the character. Gate 154 is open to read out the state of X parity flip-flop 152 at the same time that pulses are derived from the six separate stages of character buffer shift register 151 on leads 153.

If the number of mark signals within a character is odd, an indication is provided by X parity flip-flop 152 that an error occurred in the transmission of the character between the two stations. If this be the case, an output pulse is derived from gate 154 when character sync pulse is generated. This pulse activates gates 156 which are also responsive to each of the stages of most doubtful baud buffer shift register 125.

It will be recalled that buffer 125 energizes the output lead thereof commensurate with the bit in the character in which the amplitude was most doubtful i.e. the bit of least amplitude in a character. It may be presumed that the error occurred in that bit of a character in which the amplitude was least. When an output is derived upon lead 155, indicative of a parity error in a character, a pulse is then generated on that lead emanating from gates 156 in which a pulse was stored in the appropriate stage of buffer shift register 125. This pulse is, in effect, a correction pulse for the bit that was most doubtful within a character. It is applied to one of the six flip-flops included in the modulo two adders 157.

Each of the flip-flops in adders 157 is responsive to a separate one of the leads 153. If no pulse is derived from gate 156, the modulo two adders 157 pass the output signals of buffer 151 directly to gates 158. However, if there is an error in a bit within a character, one of the leads emanating from gates 156 is energized. This energization causes a reversal of state of the flip-flop within modulo two adder element 157 commensurate with the most doubtful bit. Thus, if the amplitude of the third bit in a character was lowest and the third bit was received as a zero the third bit flip-flop will cause the signal applied to gates 158 indicative of the third bit to be a one rather than a zero despite the fact that a zero is derived from character buffer 151 for the third bit. The signal stored in the six modulo two adders, i.e. the flip-flops of element 157, are passed through gates 158 once each character and applied to word buffer 159. It is to be understood that the character sync pulses applied to gates 154 and 158 do not necessarily occur simultaneously but occur only once in each character and for the same duration.

Word buffer 159 includes six separate, six stage shift registers. Each of the shift registers is responsive to a separate one of the outputs of gates 158. In effect, buffer 159 is a storage medium for each of the parallel outputs of gates 158 so that a corrected character may be inserted in a word if necessary.

If one and only one character within a word is found to be incorrect, the incorrect character is regenerated by means of the six Y parity flip-flops 161 and gates 162. One of the Y parity flip-flops 161 is provided for each of the output leads emanating from gates 158. Six intelligence bits having a common location within each of the six characters of a word are applied sequentially to each of the separate flip-flops 161. Thus, upon completion of a word, the Y parity flip-flops 161 store values commensurate with the six bits of the parity character of that word. If the bits derived from the flip-flops of modulo two adders 157 are accurate, the parity character stored in flip-flops 161 for a particular word will be exactly commensurate with the erroneous character of that word.

To control insertion of the parity word in its correct place and substitution thereof for the incorrect character within a word, character error identification buffer 163 and gates 162 and 164 are included. Buffer 163, comprised of a seven stage ring counter, has stored therein a pulse each time an error occurs in a character as determined by X parity flip-flop 152. This pulse is stepped within buffer 163 each time the character is completed and is recirculated through the ring counter once. During the recirculation operation, the pulse is applied as the input to gates 162 to effect readout of the six Y parity flip-flops 161 in parallel if a pulse is applied to the other input lead 165 of gates 162.

A pulse is provided on lead 165 only when there is but a single character error within a word. This is determined by means of character error counter 166 which is responsive to the output of gate 154, as determined by the state of X parity flip-flop 152 upon the completion of each character. The character error counter 162 is set to one of three stages, zero, one or two or more depending upon the number of pulses applied thereto during each word. If no pulses are applied to counter 166 within a word, it is set to the zero state. But if a single pulse is applied to counter 166 during a word, it is set to its first stage. It is set to its second stage if two or more pulses are applied thereto during a word. Upon completion of a word, including the parity character thereof, counter 166 is reset to the zero value.

The output of the zero and two or more stages of counter 166 are combined in an OR circuit and fed as an enabling pulse to gates 164. If two or more character errors occur within a word, no attempt is made to correct the characters but an indication is generated that the word is probably in error. Accordingly, the zero and two or more error signals derived from counter 166 have the same effect on gates 164. With a pulse directly applied to gates 164 from a counter 166 and a pulse applied to the word sync input of gates 164, the six stages of each of the six shift registers within buffer 159 are sequentially read into phrase buffer 167.

If, however, a pulse is derived from character error counter 166 and applied to gates 162, gates 164 are not responsive to the zero and two or more stages of counter 166. Instead, gates 164 are closed in response to zeros being applied thereto from buffer 163 when a word sync pulse is applied to gates 164. Coincidence between zeros from buffer 163 and word sync pulses in gates 164 results in the output signals from buffer 159 being applied to buffer 167 in exactly the same manner as if gates 164 were activated by the word sync pulse and the output of counter 166. Upon the derivation of a one pulse from buffer 163, gates 164 remain closed and the bits of the character stored in buffer 149 are not passed to buffer 167. When a one is derived from buffer 163, the parity character stored in flip-flops 161 is inserted in place of the incorrect character to the buffer 167. Regardless of whether the character is derived from flip-flops 161 or buffer 163, the input to buffer 167 is regarded as a corrected character for the purposes of the present disclosure and claims.

If errors occur in two or more characters of a single word within a phrase, the entire word may be regenerated and substituted. Control for the insertion of a parity word if only a single word contains two or more character errors is obtained by means of counter 168. Upon the completion of each word, the two or more stage of counter 166 is sampled by gate 169.

If, when gate 169 is sampled, the two or more stage of counter 166 contains a signal, the word error counter 168 is activated. Activation of counter 168 causes the signal therein to be stepped from the zero to the one state or from the one to the two or more state. If two or more signals are applied to counter 168 during a phrase the two or more state remains activated. Under these circumstances and upon completion of a phrase, a pulse is derived from the two or more stage of counter 168, and fed through gate 171 when the phrase sync pulse is generated and applied to phrase error indicator 172. Phrase error indicator 172 activates an alarm circuit to warn the operator that there is a probable malfunction in the system and to mark the teletype output that there is a probable error in the phrase under consideration.

To provide proper timing between the insertion of a parity word when one and only one character within a word is erroneous, buffer 167 having six parallel shift registers, each having thirty-six stages is provided. Six intelligence bits of each character are applied in parallel to the six shift registers within buffer 167 and are advanced through the shift registers until a complete phrase containing 216 bits is generated. Simultaneously, the six intelligance bits of each of the corrected characters is applied in parallel to the thirty-six read-in steering gates 172 which activate thirty-six B parity flip-flops 173.

The steering gates 172 are arranged in a similar manner to that illustrated in FIGURES 2 and 3 for the transmitter apparatus. The steering gates 172 are arranged so that the first bit of the first character of each of the six words in a phrase activates the flip-flop associated with the first bit of the first character of the seventh or parity word. In general, the Mth bit of the Nth character of each of the six intelligence words activate the Mth bit of the Nth character of the Z parity word.

Read-out of the thirty six flip-flops 173 is accomplished by means of the thirty six read-out gates 174 which apply their outputs of the six parallel leads which feed the six bit buffer 175. The thirty six read-out gates are interconnected with the thirty six parity flip-flops so that the first lead emanating from gate 174 is sequentially activated in response to the first bit of each of the six intelligence characters stored in the first six Z parity flip-flops i.e. those parity flip-flop responsive to first bit of each of the characters within each of the words. In a similar manner the other output leads from gates 174 are derived in response to the other thirty flip-flops in array 173.

The outputs from flip-flops 173 are coupled to six bit buffer 175 only when word error counter 168 is set to the one state. This is accomplished since the output of the one state is coupled to a coincidence gate within gates 174, one coincidence gate being provided for each of the parallel outputs.

To control which word is to be replaced by the parity word, word error identification buffer 176 is provided. Buffer 176, like buffer 163, is a seven stage ring counter which stores a signal commensurate with the word in error. The shift register signal is recirculated and an output on the recirculation cycle is obtained to energize gates 174. This output is of sufficient duration to permit all thirty six flip-flops to be read out to energize leads 177 which connect gates 174 to buffer 175. When a zero is stored in word error buffer 176, it is applied as an enabling pulse to gates 178 which are coupled to the outputs of buffer 167. When coincidence between the zeros of buffer 176 and the phrase sync pulses occurs, the signals stored in buffer 167 are passed to buffer 175 in an unaltered state. When, however, the word in error is being read out of buffer 167, gates 178 are closed due to the action of buffer 176 and the output of gates 174 are read into buffer 175.

If word counter 168 is maintained in the zero or two or more state when a phrase sync signal is generated, gates 178 are activated to permit passage of the entire phrase stored within the buffer 167. The signal applied to buffer 175 in parallel is read out in series therefrom since the buffer is a six state shift register which is stepped by the baud sync signal. The output of the six bit buffer 175 is applied to an output driver 179 which activates a standard teletype printer.

While I have described and illustrated one specific embodiment of my invention, it will be clear that variations of the details of construction which are specifically illustrated and described may be resorted to without departing from the true spirit and scope of the invention as defined in the appended claims.

I claim:

1. In a system for handling a coded binary signal, said signal being in the form of phrases derived in response to binary bits, R of said bits being arranged to form a character, Q of said characters being arranged to form a word, and P of said words being arranged to form a phrase, comprising means coupled to said signal and being responsive to the bits of each character for deriving a parity bit for each character, means coupled to said signal and being responsive to the Lth bits of each character in the Mth word for deriving a parity bit, means coupled to said signal and being responsive to the Dth bit of the Eth character of the words in a phrase for deriving a parity bit, wherein L and D are the positive integers less than R, M are the positive integers less than P, and E are the positive integers less than Q and means coupled to each of said deriving means for deriving a signal including each of said parity bits.

2. A system for coding binary bits, R of said bits constituting a character, Q of said characters constituting a word, and P of said words constituting a phrase, comprising first means responsive to R of said bits for successively generating characters, said first means including means for deriving a parity bit in response to the other bits of each of the characters, second means responsive to Q characters for successively generating words, said second means including means for deriving a parity character for each word, means for coupling, one at a time, the parity characters generated by a second means to said first means, and third means responsive to P words for successively generating phrases, said third means including means for deriving a parity word for each phrase, and means for selectively coupling the parity characters in each parity word generated by the third means to only one of said first and second means.

3. A system for coding binary bits comprising means responsive to P successive bits for deriving a parity bit, each of said P bits and said parity bit thereby forming a character, means for successively deriving $P+1$ parity bits in response to Q characters, the Lth bit of said $P+1$ parity bits being derived in response to the Lth bits of the Q characters, each of said Q characters and said $P+1$ parity bits thereby forming a word, means for successively deriving $(P+1)(Q+1)$ parity bits in response to R words, the Mth bit of the Nth character of said $(P+1)(Q+1)$ parity bits being derived in response to the Mth bit of the Nth character of R words and means responsive to each of said parity bit deriving means for successively combining each of the derived bits, where L is selectively every integer between 1 and $(P+1)$, and M is selectively every integer between 1 and $(Q+1)$.

4. A system for coding binary bits comprising first means responsive to P of said bits for deriving parallel bits, means for converting said P parallel bits into P serial bits, means responsive to said P parallel bits for deriving a parity bit, second means responsive to Q successive derivations of said P parallel bits for deriving P parallel parity bits, the Lth bit of said P parallel parity bits being derived in response to the Lth bit of each of said Q derivations, where L is selectively every bit between 1 and P, means for applying said P parallel parity bits derived from said second means to said means for converting while said converting means is unresponsive to said first means, third means responsive to R successive occurrences of Q successive derivations of said P parallel bits derived from said first means for successively deriving a Q number of times P parallel parity bits, the Mth parity bit of the Nth time being derived in response to the Mth bits of said Q derivations at the Nth times, where M is selectively every bit between 1 and Q and means for applying said P parallel parity bits derived from said third means to said means for converting Q successive times while rendering said converting means unresponsive to said first and second means.

5. A system for minimizing errors in binary information bits transmitted in phrases from a first station and received at a second station, R of said bits being arranged to form a character, Q of said characters being arranged to form a word, and P of said words being arranged to form a phrase; said first station comprising means responsive to the information bits of each character for deriving a parity bit for each character, means responsive to the Lth bits of each character in the Mth word for deriving a parity bit, and means responsive to the Dth bit of the Eth character of the words in a phrase for deriving a parity bit, wherein L and D are the positive integers less than R, M are the positive integers less than P, and E are the positive integers less than Q, means responsive to the bits of each character, word and phrase for successively transmitting signals indicative of the information and parity bits; said second station including, means for receiving the signals transmitted from the first station, means for correcting an erroneous bit in a character in response to a parity check of the bits within the words, and means for correcting erroneous words within a phrase in response to a parity check of the words within the phrase.

6. A system for correcting binary bits wherein P of said bits, when derived, were grouped to form characters including a parity bit, Q of said characters, when derived, were grouped to form words having a parity character, the Lth bit of the parity character being derived in response to the Lth bit of each character within the word, and R of said words, when derived, were grouped to form phrases having a parity word, the Mth bit of the Nth character of the parity word being derived in response to the Mth bit of the Nth character of each word within the phrase, comprising means for comparing the parity of the bits in each character with the predetermined parity of each character to derive a first indication that a character is erroneous, means responsive to the bits in each character for deriving a second indication of the most probable erroneous bit within a character, means responsive to the first and second indications for correcting the most probable erroneous bit of the character, to thereby derive a corrected character, means responsive to the first and second indications for deriving a third indication of an erroneous character within a word, means responsive to the third indication and to the Lth bit of Q of said corrected characters for replacing the Lth bit of each corrected character to thereby derive a corrected word, means responsive to the third indication for deriving a fourth indication of an erroneous word within a phrase, and means responsive to the fourth indication and to the Mth bit of the Nth character of R of said corrected words for replacing the Mth bit of the Nth character of the erroneous word with a bit indicating the parity error in the Mth bit of the Nth character of each corrected word, wherein $L=1, 2 \ldots P$; $M=1, 2, \ldots P$; $N=1, 2 \ldots Q$.

7. The system of claim 6 wherein said binary bits to be corrected are applied to the system in serial form, and said means for correcting the most probable erroneous bit of the characters includes means for converting $P-1$ of said serial bits to $P-1$ parallel bits.

8. The system of claim 7 wherein said means for replacing the Lth bit of the erroneous character includes means for deriving $P-1$ parallel bits a $Q-1$ number of times.

9. The system of claim 8 wherein said means for replacing the Mth bit of the Nth character of the erroneous word includes means for deriving $P-1$ parallel bits a $(Q-1)(R-1)$ number of times.

10. The system of claim 9 further including means for converting the $P-1$ parallel bits to serial bits.

11. The system of claim 6 including means for activating said means for replacing the Lth bit of the erroneous character only when one erroneous character occurs in each word.

12. The system of claim 6 including means for indicating when the number of erroneous characters in each word is greater than one.

13. The system of claim 6 including means for activating said means for replacing the Mth bit of the Nth character of the erroneous word only when one erroneous word occurs in each phrase.

14. The system of claim 6 including means for indicating when the number of erroneous words in each phrase is greater than one.

15. A system for parity coding characters represented by P parallel bits comprising means responsive to said P bits for converting them into P serial bits; P bi-stable elements, each being responsive to a respective one of said P bits; means for coupling signals in said P elements in parallel to said means for converting after Q characters have been applied in sequence to said converting means, said Q characters being a word; $P \times Q$ second bi-stable elements; means for simultaneously coupling the P bits in each character to a separate one of said second bi-stable elements, said last named means sequentially coupling the P bits of said Q characters to said $P \times Q$ second bi-stable elements during each word and sequentially coupling said Q characters to said $P \times Q$ second bi-stable elements for R words, said R words being a phrase; and means activated after R words have been applied in sequence to said converting means for coupling signals in P elements of said $P \times Q$ elements in parallel to said means for converting, said last named means sequentially coupling the signals of said second elements to said means for converting.

References Cited by the Examiner

UNITED STATES PATENTS

| | | | |
|---|---|---|---|
| 2,951,229 | 8/60 | Goldstein | 340—146.1 X |
| 2,954,432 | 9/60 | Lewis | 340—146.1 X |
| 2,977,047 | 3/61 | Bloch | 340—146.1 X |
| 3,037,697 | 6/62 | Kahn | 340—146.1 X |

OTHER REFERENCES

Pages 187–190, 1955, R. K. Richards, Arithmetic Operations in Digital Computers, D. Van Nostrand Co., Inc.

ROBERT C. BAILEY, *Primary Examiner.*

MALCOLM A. MORRISON, *Examiner.*